United States Patent
Kleinert et al.

(10) Patent No.: US 10,800,858 B2
(45) Date of Patent: Oct. 13, 2020

(54) CELLULOSE ETHERS SUBSTITUTED WITH HYDROXYL AND ALKYNE GROUPS AND WITH HYDROXYALKYL, ALKYNE AND AZIDE GROUPS, AND USE THEREOF AS WATER-INSOLUBLE ADHESIVES

(71) Applicant: SE Tylose GmbH & Co. KG, Weisbaden (DE)

(72) Inventors: Mike Kleinert, Mainz (DE); Diana Wischang, Gau Odernheim (DE)

(73) Assignee: SE Tylose GmbH & Co. KG, Wiesbaden (DE)

( * ) Notice: Subject to any disclaimer, the term of this patent is extended or adjusted under 35 U.S.C. 154(b) by 327 days.

(21) Appl. No.: 15/444,904

(22) Filed: Feb. 28, 2017

(65) Prior Publication Data

US 2017/0253674 A1    Sep. 7, 2017

(30) Foreign Application Priority Data

Mar. 3, 2016 (DE) .................. 10 2016 103 792

(51) Int. Cl.
| | |
|---|---|
| *C08B 11/14* | (2006.01) |
| *C08B 11/145* | (2006.01) |
| *C08B 11/193* | (2006.01) |
| *B05D 1/02* | (2006.01) |

(52) U.S. Cl.
CPC ............... *C08B 11/14* (2013.01); *B05D 1/02* (2013.01); *C08B 11/145* (2013.01); *C08B 11/193* (2013.01)

(58) Field of Classification Search
None
See application file for complete search history.

(56) References Cited

U.S. PATENT DOCUMENTS

2015/0183887 A1 * 7/2015 Kleinert ................ C08B 11/145
536/43

FOREIGN PATENT DOCUMENTS

| | | |
|---|---|---|
| CN | 102 617740 A | 8/2012 |
| DE | 37 23 897 A1 | 1/1989 |
| DE | 10 2009 022 805 A1 | 12/2010 |
| DE | 10 2015 115 804.3 | 9/2016 |
| EP | 2 712 873 A1 | 4/2014 |
| WO | WO 2015/153217 A1 | 10/2015 |

OTHER PUBLICATIONS

Eissa, Ahmed, et al. "A versatile method for functionalizing and grafting of 2-hydrowyethyl cellulose (HEC) via Click chemistry," in *Carbohydrate Polymers* 90 [2012] 859-869.
Faugerus, Pierre-Antoine, et al., "Crosslinked cellulose developed by CuAAC, a route to new materials," in *Carbohydrate Research*, 356 [2012] 247-251.
Huisgen, Rolf, "1.3-Dipolare Cycloaddition Rückschau und Ausblick", *Angewandte Chemie* 75 [1963] 604-637, (abstract).
Pahimanolis, Nikolaos. et al. article "Surface functionalization of nanofibrillated cellulose using click-chemistry approach in aqueous media" in *Cellulose* 18 [2011] 1201-1212.
Petrus, L., et al. article "Preparation of O-(3-azido-2-hydroxypropyl)cellulose and its photolysis to O-(2-formyl-2-hydroxyetyl)cellulose" in *Chem. Papers* 40 [1986] 519-522.
Yang, Fei-Fei. et al. article "A Novel Cellulose-Based Azide Energetic Material: 1-Azido-2-hydroxypropyl Cellulose Ether" in *Journal of Energetic Materials* 29 [2011] 241-260.

* cited by examiner

Primary Examiner — Nathan T Leong
(74) Attorney, Agent, or Firm — ProPat, LLC; Cathy R. Moore

(57) ABSTRACT

Nonionic, water-soluble cellulose ethers are disclosed with hydroxyalkyl groups and ω-alkynyl groups, each joined to the cellulose via an ether bond, the degree of molar substitution MS(alkyne) being in the range from 0.001 to 0.30. The cellulose ethers may further contain azido groups, preferably 3-azido-2-hydroxypropyl groups, likewise joined to the cellulose by an ether bond, the MS(AHP) being in the range from 0.001 to 0.3. To obtain an adhesive, cellulose ether is mixed with water or, if the cellulose ether contains no alkyne groups, is mixed additionally with a non-ionic cellulose ether containing ω-alkyne groups and hydroxyalkyl groups, each bonded to the cellulose by ether bonds. The mixture is applied to at least one of the surfaces to be bonded and then is contacted with a copper(I) catalyst or a ruthenium catalyst. The adhesive is especially suitable for bonding wood, paper, cardboard or other cellulosic material.

16 Claims, No Drawings

CELLULOSE ETHERS SUBSTITUTED WITH HYDROXYL AND ALKYNE GROUPS AND WITH HYDROXYALKYL, ALKYNE AND AZIDE GROUPS, AND USE THEREOF AS WATER-INSOLUBLE ADHESIVES

CROSS-REFERENCE TO RELATED APPLICATIONS

This application claims priority to German Patent Application 10 2016 103 792.3 filed Mar. 3, 2016, which is hereby incorporated herein by reference in its entirety.

FIELD OF THE INVENTION

The invention relates to cellulose ethers etherified with hydroxyalkyl groups, 3-azidohydroxyalkyl groups, and alkyne groups. In the presence of a catalyst, the cellulose ethers substituted accordingly undergo crosslinking to form water-insoluble adhesives.

BACKGROUND OF THE INVENTION

The cellulose ethers are, more particularly, non-ionic cellulose ethers, based on hydroxyalkyl celluloses, such as hydroxyethyl cellulose (HEC) or hydroxypropyl cellulose (HPC) with coetherification by azidohydroxyalkyl substituents. These bifunctionalized "azide" mixed ethers may be used in adhesive systems either
i) in a mixture with analogous, bifunctionalized "alkyne" mixed ethers or
ii) in a form converted by third-party functionalization into an "azide-alkyne" mixed ether. The adhesives are especially suitable for bonding organic substrates such as paper, cardboard or wood.

Cellulose modified with 3-azido-2-hydroxyalkyl groups (AHP groups) is described in the L. Petrus et al. article "Preparation of O-(3-azido-2-hydroxypropyl)cellulose and its photolysis to O-(2-formyl-2-hydroxyethyl)cellulose" in *Chem. Papers* 40 [1986] 519-522. The cellulose ether contains no groups other than the AHP groups. Cellulose substituted with a particularly high fraction of AHP groups is a subject of the F.-F. Yang et al. article "A Novel Cellulose-Based Azide Energetic Material: 1-Azido-2-hydroxypropyl Cellulose Ether" in *Journal of Energetic Materials* 29 [2011] 241-260. The nitrogen fraction in the cellulose ether is more than 10% by weight. The cellulose ether is intended as an explosive.

The N. Pahimanolis et al. article "Surface functionalization of nanofibrillated cellulose using click-chemistry approach in aqueous media" in *Cellulose* 18 [2011] 1201-1212 describes the reaction of nanofibrillated cellulose with 1-azido-2-epoxy propane. The resulting 3-azido-2-hydroxypropyl cellulose is then reacted with an alkyne, propargylamine for example, in a copper(I)-catalysed "Click" reaction. The products are [1,2,3]-triazoles.

Nonionic cellulose ethers containing AHP groups and hydroxyalkyl groups, and processes for preparing them, are disclosed in EP 2 712 873 A1. The cellulose ethers thus modified are water-soluble. Through the incorporation of the AHP groups it is possible to modify the rheological properties of the cellulose ethers within broad ranges by reacting the azide termini with alkynes.

Cellulose ethers, as is known, can also be used as adhesives (e.g. wallpaper pastes). Under the action of water or moisture, however, there is a sharp drop in the adhesive effect, because the cellulose ethers are dissolved to a greater or lesser extent.

Water-soluble cellulose ethers having 3-azido-2-hydroxypropyl groups can result in moisture-stable adhesive bonds if they are mixed with alkynes and with copper catalysts and/or ruthenium catalysts. In that case the azide groups react with the alkyne groups in a cycloaddition reaction to form [1,2,3]-triazole groups. As a result, a strong adhesive can be obtained, which retains its properties even in a humid environment, as disclosed in DE 10 2015 115 804.3. For the switchable changes in property that are described therein, three components have to date been required in principle:
1. an azide-functionalized cellulose ether,
2. a suitable alkyne component, and
3. a catalyst, preferably in dissolved form.

For the particular intended effect, such as the change in viscosity of a solution or the change in solubility (viscous fluid→structurally elastic solid), all three components must be brought together at defined time intervals and mixed, something which in a particular application scenario may be difficult and entails considerable technical effort.

SUMMARY OF ADVANTAGEOUS EMBODIMENTS OF THE INVENTION

The object, therefore, was to simplify this three-way combination so that it is easier to employ.

It has now been found, surprisingly, that under defined, moderate conditions, cellulose can be coetherified with (i) an alkylene oxide, such as ethylene oxide or propylene oxide, (ii) glycidyl azide and (iii) an alkyne halide, such as propargyl bromide.

The unwanted, premature thermal formation of triazole (see R. Huisgen, "1.3-Dipolare Cycloadditionen Rückschau and Ausblick", Angew. Chem. 75 [1963] 604-637) does not occur in this case, thus opening access to cellulose ethers with ternary functionalization, such as to azido-alkyne-hydroxyethyl cellulose ethers, "azoin-HEC". These ethers (component 1) are water-soluble and are able to produce an aqueous solution of increased viscosity, whose rheological properties can be modified greatly according to the invention by addition of a suitable catalyst (component 2).

An alternative preparation of a two-component system of this kind can be realized for the specific application scenario of adhesive bonding, by mixing two different, orthogonally functionalized cellulose ethers as a solid. For the end application, this homogeneous, powder-form mixture of two ingredients (component 1) is advantageous, since these products are likewise able to produce an aqueous solution of enhanced viscosity whose rheological properties can be modified greatly in accordance with the invention by addition of a suitable catalyst (component 2).

DETAILED DESCRIPTION OF ADVANTAGEOUS EMBODIMENTS OF THE INVENTION

The invention accordingly provides non-ionic, water-soluble cellulose ethers having hydroxyalkyl groups and ω-alkynyl groups, each joined to the cellulose by an ether bond, the degree of molar substitution MS(alkyne) being in the range from 0.001 to 0.30. In one preferred embodiment, the cellulose ether further comprises azido groups, more preferably 3-azido-2-hydroxypropyl groups, which are likewise joined to the cellulose via an ether bond, the degree of molar substitution MS(AHP) being in the range from 0.001 to 0.30.

The non-ionic cellulose ethers of the invention, furthermore, may contain still further groups joined to the parent cellulose structure via an ether bond. These groups are preferably (C1-C6)alkyl groups, more preferably methyl, ethyl, propyl, isopropyl, butyl, isobutyl, sec-butyl, pentyl or hexyl groups.

The hydroxyalkyl groups are preferably 2-hydroxyethyl or 2-hydroxypropyl groups. They are formed in the reaction of the cellulose or cellulose ether with ethylene oxide or propylene oxide. The alkynyl groups have preferably 3 to 6 carbon atoms; particularly preferred are propargyl groups (=3-propynyl groups).

Water-insoluble, firm adhesive bonds are obtained if the water-soluble, ternary azoin-cellulose ethers react with one another under copper and/or ruthenium catalysis and crosslink accordingly. A comparable behaviour can be obtained in aqueous solutions of premixed azidohydroxyalkylcellulose ether and alkyne-hydroxyalkyl-cellulose ether products under the action of copper compounds and/or ruthenium compounds.

Preferred starting materials, accordingly, are water-soluble, non-ionic cellulose ethers, such as hydroxyathyl-cellulose (HEC), hydroxypropylcellulose (HPC), methylhydroxyethylcellulose, or methylhydroxypropylcellulose, in the case of methylhydroxyethylcelluloses and methylhydroxypropylcelluloses, the degree of substitution DS(Me) is generally 1.0 to 2.5, preferably 1.2 to 2.5, more preferably 1.4 to 1.9, and the degree of substitution MS(HE and/or HP) is generally 0.01 to 1.0, preferably 0.05 to 0.8, more preferably 0.05 to 0.6. In the case of hydroxyethylcelluloses and hydroxypropylcelluloses, the degree of substitution MS(HE and/or HP) is generally 1.0 to 4.0, preferably 1.5 to 3.3. The non-ionic cellulose ethers of the invention are produced preferably from wood pulp, such as spruce pulp or eucalyptus pulp, for example. The cellulose therein customarily has an average degree of polymerization DPn of 500 to 2500, preferably of 700 to 1500.

"Water-soluble" in the context of the present invention means that the unmodified cellulose ether is soluble in cold water (20° C.) to an extent of more than 1.0% (w/w), preferably more than 10% (w/w), more preferably more than 20% (w/w).

The cellulose ethers with AHP groups are obtainable by reaction of the corresponding cellulose ether with glycidyl azide, as described in EP 2 712 873 A1, for example.

The 3-azido-2-hydroxypropyl groups in this case may be bound to the cellulose ethers via the hydroxyl groups of the ethylene glycol and/or propylene glycol side chains, or directly via the hydroxyl groups of the anhydroglucose units. The average degree of substitution of the cellulose with the 3-azido-2-hydroxypropyl groups (MS(AHP)) is generally in the range from 0.001 to 0.30 per anhydroglucose unit, the MS being preferably in the range from 0.05 to 0.25. The cellulose ethers substituted with azide groups usefully have an average degree of polymerization DPn of 50 to 4000, preferably of 1000 to 2500, more preferably of 700 to 1500.

Cellulose ethers with 3-azido-2-hydroxypropyl groups can also be obtained if alkalified cellulose is reacted immediately in succession or simultaneously with an alkylene oxide and glycidyl azide in one and the same reactor, in the form of a conventional coetherification.

Cellulose ethers with terminal alkyne groups are obtainable, for example, by reaction of the corresponding cellulose ether with alkynyl halides in accordance with conventional Williamson ether synthesis, with propargyl bromide, for example. The alkynyl groups in this case may be bound to the cellulose via the hydroxyl groups of the ethylene glycol and/or propylene glycol side chains or directly by the hydroxyl groups of the anhydroglucose units. The average degree of substitution of the cellulose with the alkynyl groups (MS(alkyne)) is generally in the range from 0.001 to 0.30 per anhydroglucose unit, the MS being preferably in the range from 0.05 to 0.25. The cellulose ethers substituted with alkyne groups usefully have an average degree of polymerization, DPn, of 500 to 4000, preferably of 600 to 2500, more preferably of 700 to 1500.

The thermally induced Huisgen cycloaddition produces mixture of regioisomers. The 1,3-dipolar cycloaddition of azides onto alkynes (Huisgen reaction) therefore takes place usefully by means of Cu(I) catalysts. This produces regioselectively 1,4-disubstituted [1,2,3]-triazoles. Suitability is possessed, for example, by Cu(I) bromide, Cu(I)-iodide or Cu(I)-acetate. Catalytically active Cu(I) salts can also be prepared in situ, as for example from copper(II) sulphate by reduction with ascorbic acid in aqueous solution. The metal-catalysed reactions generally proceed even at room temperature. The conversion of the liquid or fluid starting materials into a solid adhesive takes place even at room temperature within a few seconds, generally in less than 60 seconds, preferably in less than 10 seconds.

The azide-alkyne cycloaddition can also be catalysed by ruthenium compounds, such as by bis(triphenylphosphine) cyclopentadienylruthenium chloride. In this case, however, in contrast to the copper-catalysed reaction, the products are regioselectively 1,5-disubstituted [1,2,3]-triazoles.

The examples below serve to illustrate the invention. Percentages therein are percentages by weight unless otherwise indicated or immediately obvious from the context. DS and MS values were determined by the Zeisel method.

Example 1: "Alkyne-HEC": Preparation of Propargylhydroxyethylcellulose from Pulp by Coetherification In a 2 litre glass autoclave fitted with an anchor stirrer, 83.6 g of spruce pulp having an average degree of polymerization DPn of 850 (0.50 mol, 97% dry fraction) were suspended in 531 g of isopropanol. The reactor was rendered inert with nitrogen, a solution of 22.0 g of NaOH (0.55 mol) in 131 g of water was added, the reactor was rendered inert again, and the mixture was stirred at 25° C. for 35 minutes. Then 86.1 ml of ethylene oxide (74.9 g, 1.70 mol) were added, the temperature was raised to 45° C. over a period of 30 minutes, and the mixture was held at this temperature for 60 minutes. This was followed by addition of 29.7 g of 80% strength solution of propargyl bromide in toluene (0.20 mol); the mixture was heated to 85° C. over 60 minutes and held at this temperature for 90 minutes. After the mixture had cooled to 30° C., it was neutralized with 34.6 g of 31% strength HCl solution (0.295 mol) and 3.20 g of acetic acid (0.055 mol) against phenolphthalein. The product was isolated by filtration and washed twice with 85% aqueous isopropanol and acetone until the salt content of the product was less than 0.5% (determined by conductivity measurement). The product was dried at 70° C. overnight.

Example 2: "Azoin-HEC": Preparation of Azidohydroxypropylpropargyl-Hydroxyethylcellulose from Pulp by Coetherification In a 2 litre glass autoclave fitted with an anchor stirrer, 83.6 g of spruce pulp having an average degree of polymerization DPn of 850 (0.50 mol, 97% dry fraction) were suspended in 531 g of isopropanol. The reactor was rendered inert with nitrogen, a solution of 22.0 g of NaOH (0.55 mol) in 131 g of water was added, the reactor was rendered inert again, and the mixture was stirred at 25° C. for 35 minutes. Then 86.1 ml of ethylene oxide (74.9 g, 1.70 mol) were added, the temperature was raised to 45° C. over a period of 30 minutes, and the mixture was held at this temperature for 60 minutes. This was followed by addition of 29.7 g of 80% strength solution of propargyl bromide in toluene (0.20 mol) and 1 g of a 57.5% strength solution of glycidyl azide in ether (0.20 mol) (for preparation see DE 10 2012 019 134 A1); the mixture was heated to 70° C. over 60 minutes and held at this temperature for 225 minutes. After the mixture had cooled to 30° C., it was neutralized with 34.6 g of 31% strength HCl solution (0.295 mol) and 3.20 g of acetic acid (0.055 mol) against phenolphthalein.

The product was isolated by filtration and washed twice with 85% aqueous isopropanol and acetone until the salt content of the product was less than 0.5% (determined by conductivity measurement). The product was dried at 70° C. overnight.

Example 3: "Click AHP-HEC Alkyne-HEC": Copper-Catalysed Coupling of a Propargyihydroxyethylcellulose/Azidohydroxypropyihydroxyethylcellulose (AHP-HEC) Mixture with CuSO₄ 5 H₂O for the Bonding of Wood 10.0 g of a 1:1 propargyl-HEC/AHP-HEC mixture [5% WC, MS(EO) 1.9. DS(propargyl) 0.20, MS(GA) 0.20] were stirred into 1000 ml of cold tap water and dissolved by stirring at room temperature. The clear solution had a viscosity of about 250 mPas (Brookfield, LV). A portion of the solution (about 50 ml) was applied with a brush to two smooth, dry spruce-wood surfaces. After a waiting time of about 5 minutes for partial intake of the solution into the pores in the wood, one of the two wood surfaces was sprayed with a solution consisting of 10.0 g of copper sulphate pentahydrate, and 18.0 g of ascorbic acid in 60 ml of devolatilized, demineralized water, using a commercial spray bottle, and the other wood surface, likewise glued, was immediately pressed on by a gentle rubbing motion and fixed, in the same manner as carried out industrially in the conventional gluing of wood. The next day, the bond had dried and the pieces of wood could not be moved relative to one another or removed from one another. Immersion of the bonded wood plates in water for a period of 18 hours did not noticeably affect the adhesive bond, and, while the bond could be broken on considerable application of force, its breaking involved extraction of fibres from the counterpart workpiece.

Example 4: "Click Azoin-HEC": Copper-Catalysed Coupling of Azidohydroxypropylpropargylhydroxyethylcellulose (AHP-propargyl-HEC) with CuSO₄ Pentahydrate for the Bonding of Wood 10.0 g of an AHP-propargyl-HEC [5% WC, MS(EO) 1.9, DS(propargyl) 0.20, MS(GA) 0.20, DPn 850] were stirred into 1000 ml of cold tap water and dissolved by stirring at room temperature. The clear solution had a viscosity of about 250 mPas (Brookfield, LV). A portion of the solution (about 50 ml) was applied with a brush to two smooth, dry spruce-wood surfaces. After a waiting time of about 5 minutes for partial intake of the solution into the pores in the wood, one of the two wood surfaces was sprayed with a solution consisting of 10.0 g of copper sulphate pentahydrate and 18.0 g of ascorbic acid in 60 ml of devolatilized, demineralized water, using a commercial spray bottle, and the other wood surface, likewise glued, was immediately pressed on by a gentle rubbing motion and fixed, in the same manner as carried out industrially in the conventional gluing of wood. The next day, the bond had dried and the pieces of wood could not be moved relative to one another or removed from one another. Immersion of the bonded wood plates in water for a period of 18 hours did not noticeably affect the adhesive bond, and, while the bond could be broken on considerable application of force, its breaking involved extraction of fibres from the counterpart workpiece.

That which is claimed:

1. Nonionic, water-soluble cellulose ethers comprising hydroxyalkyl groups and ω-alkynyl groups, each joined to the cellulose via an ether bond, with a degree of molar substitution for alkyne, MS(alkyne), in a range from 0.001 to 0.30.

2. Cellulose ethers according to claim 1, wherein said cellulose ether further contains azido groups which are joined to the cellulose by an ether bond.

3. Cellulose ethers according to claim 2, wherein said azido groups are 3-azido-2-hydroxypropyl (AHP) groups.

4. Cellulose ethers according to claim 3, wherein the molar substitution for AHP, MS(AHP), is in the range from 0.05 to 0.25.

5. Cellulose ethers according to claim 3, with a degree of molar substitution for AHP, MS(AHP), in a range from 0.001 to 0.3.

6. Cellulose ethers according to claim 1, wherein said cellulose ether additionally contains alkyl groups joined to the cellulose by an ether bond.

7. Cellulose ethers according to claim 6, wherein the alkyl groups are straight-chain (C1-C6) alkyl groups.

8. Cellulose ethers according to claim 6, wherein the alkyl groups are methyl or ethyl groups.

9. Cellulose ethers according to claim 1, wherein the ω-alkynyl groups have 3 to 6 carbon atoms.

10. Cellulose ethers according to claim 8, wherein the ω-alkynyl groups are propargyl groups.

11. Cellulose ethers according to claim 1, wherein the hydroxyalkyl groups are 2-hydroxyethyl or 2-hydroxypropyl groups.

12. Cellulose ethers according to claim 1, wherein the MS(alkyne) is in the range from 0.05 to 0.25.

13. Cellulose ethers according to claim 1, wherein the cellulose ether has an average degree of polymerization DPn, determined by the Cuoxam method, of 50 to 4000.

14. Cellulose ether according to claim 13, wherein the cellulose ether has an average degree of polymerization DPn, by the Cuoxam method, of 1000 to 2500.

15. Cellulose ethers according to one or more of claim 13, wherein the cellulose ether has an average degree of polymerization DPn, by the Cuoxam method, of 700 to 1500.

16. Nonionic cellulose ethers comprising hydroxyalkyl moieties and ω-alkynyl moieties, each joined to the cellulose via an ether bond, said cellulose ethers further containing azido moieties joined to the cellulose by an ether bond, wherein the ω-alkynyl moieties and azido moieties have been reacted to each other.

* * * * *